(12) United States Patent
Ploeger et al.

(10) Patent No.: US 10,680,497 B2
(45) Date of Patent: Jun. 9, 2020

(54) FLUID-COOLED HOUSING FOR AN ELECTRICAL MACHINE

(71) Applicant: Robert Bosch GmbH, Stuttgart (DE)

(72) Inventors: Armin Ploeger, Hildesheim (DE); Camilo Carrillo, Stuttgart (DE); Karsten Kirchhoff, Sehlem (DE); Stephan Geise, Ruethen (DE); Uwe Knappenberger, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 547 days.

(21) Appl. No.: 15/519,871

(22) PCT Filed: Sep. 1, 2015

(86) PCT No.: PCT/EP2015/069942
§ 371 (c)(1),
(2) Date: Apr. 18, 2017

(87) PCT Pub. No.: WO2016/062440
PCT Pub. Date: Apr. 28, 2016

(65) Prior Publication Data
US 2017/0244305 A1    Aug. 24, 2017

(30) Foreign Application Priority Data
Oct. 23, 2014    (DE) .......................... 10 2014 221 574

(51) Int. Cl.
*H02K 9/197*    (2006.01)
*F16J 15/10*    (2006.01)
(Continued)

(52) U.S. Cl.
CPC ............ *H02K 9/197* (2013.01); *F16J 15/106* (2013.01); *H02K 5/06* (2013.01); *H02K 5/18* (2013.01); *H02K 5/20* (2013.01); *H02K 9/19* (2013.01)

(58) Field of Classification Search
CPC ............ H02K 9/197; H02K 5/08; H02K 5/18; H02K 5/20; H02K 5/26; F16J 15/106; F16J 15/104; F16J 15/102; F16J 15/10
(Continued)

(56) References Cited

U.S. PATENT DOCUMENTS 3,127,530 A * 3/1964 White ................. F04B 53/08
                                                    310/54
2012/0187798 A1 * 7/2012 Shirai .................... H02K 1/165
                                                    310/216.001
(Continued)

FOREIGN PATENT DOCUMENTS

DE          19624519        1/1998
EP          2701286         2/2014
(Continued)

OTHER PUBLICATIONS

International Search Report for Application No. PCT/EP2015/069942 dated Jun. 6, 2016 (English Translation, 2 pages).

*Primary Examiner* — Terrance L Kenerly
(74) *Attorney, Agent, or Firm* — Michael Best & Friedrich LLP

(57) ABSTRACT

The invention relates to a housing (10) for an electrical machine (50) and to an electrical machine (50) having such a housing (10). The housing (10) comprises an inner wall (12) and an outer wall (14), with a hollow space (16) therebetween for cooling the electrical machine (50) with a fluid. The housing (10) further has a sealing device (24, 26) on a front face (22, 23) of the housing (10). The housing is particularly characterised in that the sealing device (24, 26) comprises an annular sealing element (28) mounted between the inner wall (12) and the outer wall (14) so as to seal the front face, and in that the sealing device (24, 26) comprises a deflection ridge (30) which projects from the sealing element (28) in the axial direction of the housing (10) and is at least partially arranged between the walls (12, 14), the deflection ridge (30) being designed to lead a cooling fluid in the hollow space (16). A compact, economical and fluid-tight housing (10) can thus be advantageously provided.

10 Claims, 3 Drawing Sheets

(51) Int. Cl.
*H02K 5/20* (2006.01)
*H02K 5/06* (2006.01)
*H02K 5/18* (2006.01)
*H02K 9/19* (2006.01)

(58) Field of Classification Search
USPC .......................................................... 310/54
See application file for complete search history.

(56) References Cited

U.S. PATENT DOCUMENTS

| 2014/0205429 A1* | 7/2014 | Harwell | F16L 23/18 |
| | | | 415/1 |
| 2015/0159788 A1* | 6/2015 | Sasinowski | F16J 15/104 |
| | | | 285/345 |
| 2015/0357746 A1* | 12/2015 | Beischer | H01R 13/5202 |
| | | | 439/587 |

FOREIGN PATENT DOCUMENTS

| EP | 2717438 | 4/2014 |
| WO | 2006106086 | 10/2006 |

\* cited by examiner

FLUID-COOLED HOUSING FOR AN ELECTRICAL MACHINE

BACKGROUND OF THE INVENTION

The invention relates to a housing with cooling for an electrical machine using fluid, and also to an electrical machine comprising a fluid-cooled housing.

In electrical machines, such as electric motors or generators for example, increased performance requirements and/or efficiency requirements for example may result in suitable cooling apparatuses being required to dissipate heat which is generated by power being lost.

Cooling apparatuses are often designed in the form of a cooling jacket in a housing of the electrical machine, so that the housing performs the cooling function. Cooling jackets of this kind can be realized, for example, as double-walled housings. To this end, the housing can be designed as a hollow-cylindrical extruded part having a plurality of ducts which are open in the direction of both end faces. By way of example, an end plate can be provided as a cover on each end face of the housing, it being possible for said end plate to have deflection grooves which connect the ducts to one another and can deflect a cooling fluid between the ducts. However, housings of this kind may require a complicated sealing apparatus which can reliably prevent cooling fluid from escaping from the housing. Accordingly, production of a housing of this kind may be relatively complicated and expensive.

In order to increase heat transfer from the electrical machine to the cooling fluid, it is possible, amongst other things, for the size of a cooling area to be increased and/or for a flow rate of the cooling fluid to be increased. To this end, a meandering cooling duct can be formed in the housing for example, as described in DE 10 2012 215 018 A1 by way of example.

SUMMARY OF THE INVENTION

Embodiments of the present invention can advantageously allow a cost-effective, compact and leaktight housing with an efficient cooling apparatus for an electrical machine to be provided.

A first aspect of the invention proposes a housing for an electrical machine, such as an electric motor or a generator for example. The housing has an inner wall and an outer wall which are arranged concentrically in relation to one another and at a distance from one another in a radial direction. In this case, a hollow space, which is delimited in the radial direction by the walls, for cooling the electrical machine using fluid is formed between the inner wall and the outer wall. The housing further has a sealing apparatus which is arranged on an end face of the housing. The housing according to the invention is distinguished in particular in that the sealing apparatus has an annular sealing element which is held at the end face in a sealing manner between the inner wall and the outer wall. The sealing apparatus further has a deflection fin which protrudes from the sealing element in an axial direction of the housing and is arranged at least partially between the inner wall and the outer wall, wherein the deflection fin is designed to guide and to deflect a cooling fluid in the hollow space and/or to provide a flow resistance for the cooling fluid.

The sealing apparatus comprising the annular sealing element can in this way provide comprehensive and reliable sealing of the housing in the radial and in the axial direction. Furthermore, the sealing apparatus can at the same time advantageously provide a deflection function for the cooling fluid, so that a sufficiently high flow rate of cooling fluid through the housing and, accompanying this, efficient cooling with a high level of heat transfer from the electrical machine to the cooling fluid can be ensured. Owing to the integration of the deflection function in the sealing apparatus, the housing can be of compact design and can be produced in a cost-effective manner, without deflection grooves, for example in the form of cast cavities in an end plate of the housing, having to be formed.

Further sealing functions with respect to an area surrounding the housing and also an inlet and an outlet for the cooling fluid and sealing of said inlet and outlet can also be integrated in the sealing apparatus.

The axial direction can define a direction of longitudinal extent of the housing, and the radial direction can define a direction which is orthogonal in relation to the axial direction.

According to one embodiment of the invention, the sealing element and the deflection fin are integrally formed. By way of example, the sealing apparatus comprising a sealing element and a deflection fin can be produced from plastic using an injection-molding method or from metal. An integral design of the sealing apparatus can reduce production costs and also servicing work by reducing the number of components.

According to one embodiment of the invention, the sealing apparatus has a plurality of deflection fins which are arranged along a circumference of the sealing element at a distance from one another in the circumferential direction and protrude in the manner of fingers from the sealing element in the axial direction. By virtue of a plurality of deflection fins being formed, a flow of the cooling fluid in the hollow space in the housing can be deflected in such a way that so-called dead water areas, in which air bubbles can collect for example, can be avoided. Overall, cooling efficiency can be increased in this way.

According to one embodiment of the invention, guide fins, which extend along the axial direction of the housing, are arranged between the inner and the outer wall at a distance from one another in the circumferential direction, wherein the guide fins are designed to guide the cooling fluid in the hollow space, that is to say to conduct said cooling fluid in a preferred flow direction. By virtue of the guide fins, the flow of the cooling fluid can additionally be deflected in a suitable manner to the deflection fins, so that cooling efficiency can be further increased. The guide fins can be produced, for example, by an extrusion process and can be integrally formed with the inner and/or the outer wall. For reasons of production, the guide fins can therefore extend over at least 20%, preferably at least 50%, of a longitudinal extent of the walls. The guide fins can also be fastened, for example adhesively bonded or welded, to the inner and/or the outer wall as separate components.

According to one embodiment of the invention, the deflection fin of the sealing apparatus is arranged in alignment with one of the guide fins. In this case, the deflection fin can adjoin the guide fin and/or bear flush against said guide fin.

According to one embodiment of the invention, the sealing apparatus has a plurality of deflection fins which are each arranged in alignment with one of the guide fins. As a result, the cooling fluid can be deflected or guided with a complex deflection geometry in order to further increase the cooling efficiency.

According to a further embodiment of the invention, the housing has a further sealing apparatus with a further sealing element and at least one further deflection fin, wherein the sealing apparatus and the further sealing apparatus are arranged on two opposite end faces of the housing. As a result, the cooling fluid can advantageously be deflected in an alternating manner parallel and antiparallel in relation to the axial direction, so that a meandering flow of the cooling fluid in the housing without dead water areas can be realized and heat can be dissipated in an efficient manner.

According to one embodiment of the invention, the sealing apparatus has a plurality of deflection fins, and the further sealing apparatus has a plurality of further deflection fins, wherein guide fins, which extend along the axial direction, are arranged between the inner and the outer wall at a distance from one another in the circumferential direction. In this case, one of the deflection fins and one of the further deflection fins are arranged in alignment with one of the guide fins. The remaining deflection fins and the remaining further deflection fins are each arranged in an alternating manner on opposite sides of the housing in alignment with in each case one of the remaining guide fins, so that the deflection fins and the guide fins form a meandering cooling duct in the hollow space.

According to one embodiment of the invention, at least one sealing lip which runs on an inner circumference and/or an outer circumference of the sealing element and protrudes from said sealing element in a radial manner and bears in a sealing manner against in each case one of the walls is arranged on the annular sealing element. Comprehensive and reliable sealing of the housing against cooling fluid leaking out of the hollow space both in the axial and in the radial direction can be provided in a cost-effective manner in this way.

According to one embodiment of the invention, the walls of the housing are extruded. The housing can be produced, for example, as a double-walled housing with guide fins which are integrally formed on the inner and/or outer wall in a cost-effective manner in few working steps.

A further aspect of the invention relates to an electrical machine, such as an electric motor or a generator for example, comprising a housing as described in the text above and that which follows. The electrical machine and, respectively, the housing can further each have an end plate as a kind of cover at each end face of the housing, wherein the sealing apparatus can also advantageously provide a leaktight connection between the end plates and further components of the housing.

It should be noted that some of the possible features and advantages of the invention are described herein with reference to various embodiments. A person skilled in the art will understand that the features can be combined, adapted or replaced in a suitable manner in order to arrive at further embodiments of the invention.

BRIEF DESCRIPTION OF THE DRAWINGS

Embodiments of the invention will be described below with reference to the attached drawings, wherein neither the drawings nor the description should be interpreted as restrictive to the invention.

The figures are merely schematic and are not true to scale. Identical reference symbols in the figures denote identical or functionally identical features.

DETAILED DESCRIPTION

Figure 1:
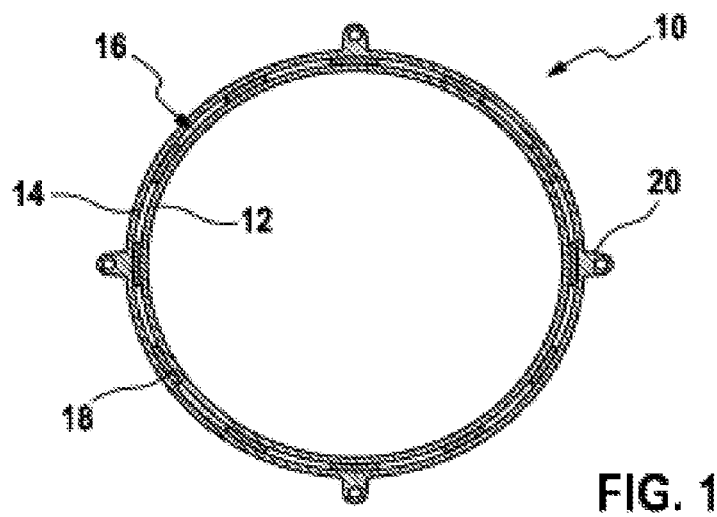
FIG. 1 shows a section through a portion of a housing according to one embodiment of the invention.

FIG. 1 shows a section through a portion of a housing 10 for an electrical machine according to one embodiment of the invention. The section in said figure runs orthogonally to an axial direction or orthogonally to a direction of longitudinal extent of the housing 10.

The housing 10 is configured as a double-walled, hollow-cylindrical housing with an inner wall 12 and an outer wall 14 which are arranged concentrically in relation to one another and are at a distance from one another in a radial direction, so that a hollow space 16, which is delimited by the walls 12, 14 in the radial direction, is formed for cooling the electrical machine using fluid. To this end, the hollow space 16 can be filled with a cooling fluid, for example with water and/or with another liquid medium. The housing with the inner wall 12 and the outer wall 14 can be integrally produced or formed, for example, using an extrusion process. The inner wall 12 and the outer wall 14 can also be locally adhesively bonded and/or welded to one another as separate components.

Between the inner wall 12 and the outer wall 14, the housing 10 has guide fins 18 which are at a distance from one another in the circumferential direction of the housing 10, which extend along the axial direction of the housing 10 and which are designed to guide the cooling fluid in the hollow space 16, preferably in the axial direction. The guide fins 18 can be integrally formed with the inner wall 12 and/or the outer wall 14 or can be fastened, for example adhesively bonded and/or welded, to the inner wall 12 and/or the outer wall 14 as separate components. In this case, the guide fins can extend over at least 20%, preferably over at least 50% or at least 80%, of a longitudinal extent of the inner and/or the outer wall 12, 14. Overall, a plurality of partial hollow spaces which run parallel in relation to one another can be formed in the hollow space 16 in this way, said partial hollow spaces each being delimited in the circumferential direction by two directly adjacent guide fins 18 and in the radial direction by the inner wall 12 and the outer wall 14.

Furthermore, a plurality of fastening apparatuses 20 are arranged on the outside of the outer wall 14, so that a cover, for example an end plate, can be fastened to each end face of the housing 10, for example by means of a screw and/or rivet connection. In this case, the fastening apparatuses 20 can be arranged in the region of the guide fins 18 and/or such that they lie between said guide fins.

Figure 2A:
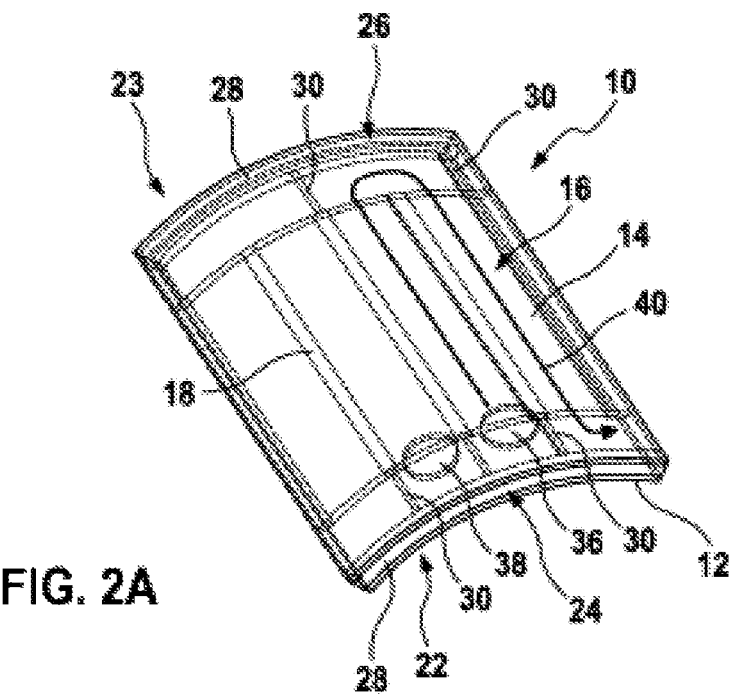
FIGS. 2A, 2B and 2C each show a section through a portion of a housing according to a further embodiment of the invention.
Figure 2B:
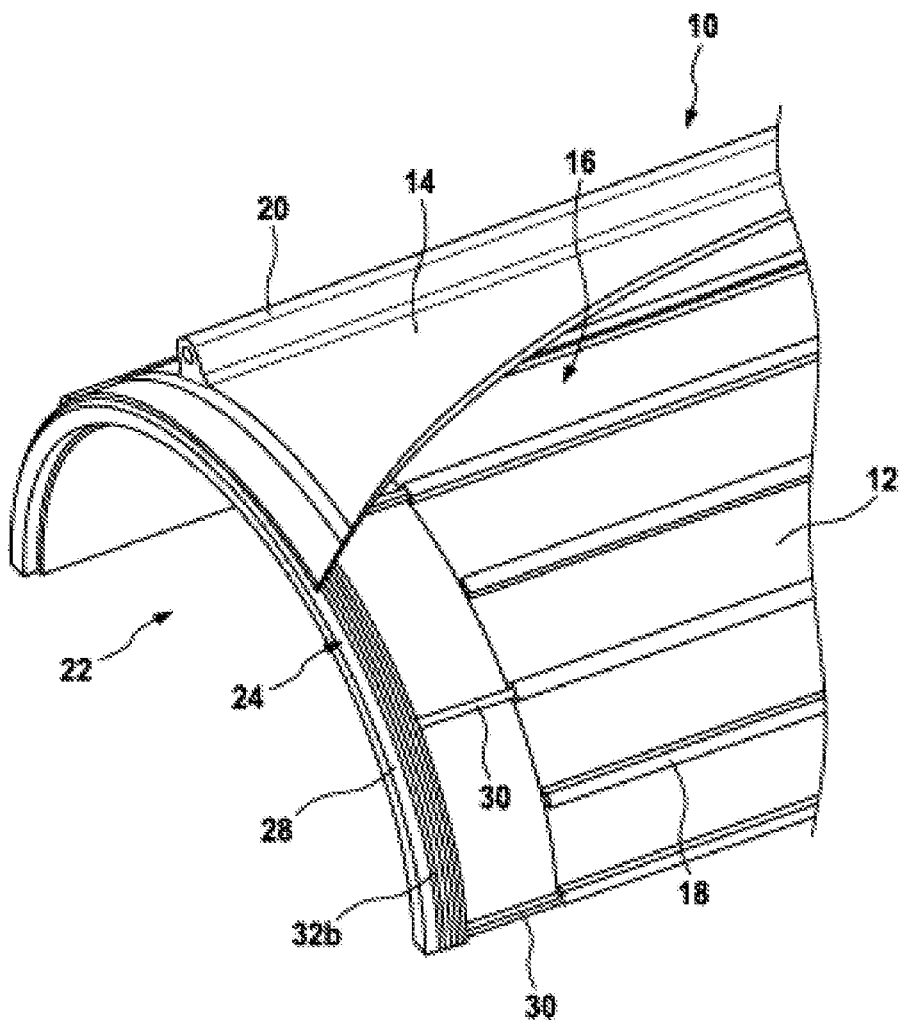
Figure 2C:
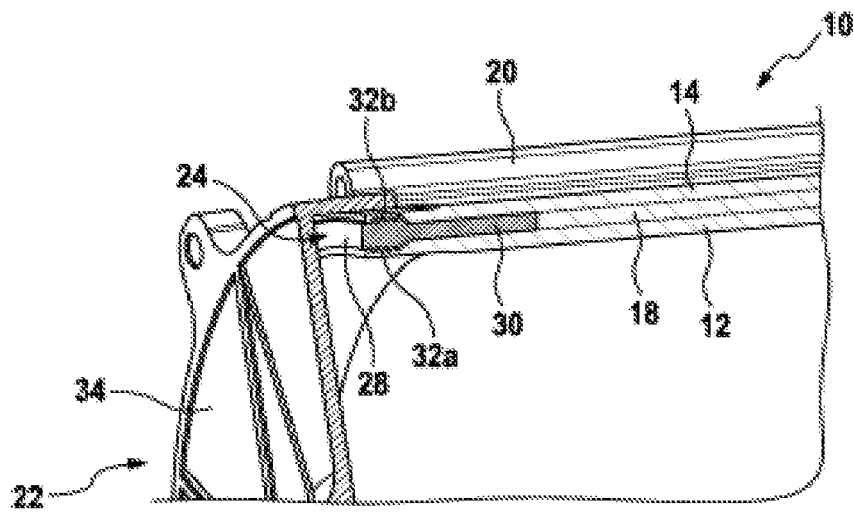

FIGS. 2A, 2B and 2C each show a section through a portion of a housing 10 for an electrical machine according to a further embodiment of the invention.

The housing 10 has a sealing apparatus 24 at a first end face 22 and a further sealing apparatus 26 at a second end face 23.

The sealing apparatuses 24, 26 each have an annular sealing element 28 which is held in an interlocking manner at the end face in a sealing manner between the inner wall 12 and the outer wall 14 and bears against one of the walls 12, 14 by way of in each case one side. In order to support and/or hold a sealing element 28 in the housing 10, a cylindrical seat can be made in the end face of the inner and/or outer wall 12, 14, for example by turning machining, so that the sealing element 28 is held in an interlocking manner with a press fit.

Furthermore, each of the sealing apparatuses 24, 26 has a plurality of deflection fins 30 which are at a distance from one another in the circumferential direction of the housing 10. In this case, the deflection fins 30 protrude in the manner of fingers from the sealing element 28 in the axial direction and extend parallel in relation to one another in the axial direction. The deflection fins 30 can have a rectangular, square, round or any other desired cross section. For support and/or fixing purposes, recesses which are configured such that they cooperate with an outer contour of the deflection fins 30 and in which the deflection fins 30 can be at least partially held can also be provided on the inner wall 12 and/or the outer wall 14 in the region of the end faces 22, 23.

Each of the deflection fins 30 is arranged in alignment with one of the guide fins 18 and is designed to guide and/or to deflect the cooling fluid in the hollow space 16, as described in greater detail in the text which follows. To this end, the deflection fins 28 can each adjoin one of the guide fins 18 and/or bear flush against said guide fins, so that a certain flow resistance for deflecting the cooling fluid is provided.

Furthermore, the deflection fins 30 can each bear against the inner and/or the outer wall 12, 14 or can be at a distance from at least one of the walls 12, 14. Overall, the sealing apparatus 24, 26 is held between the inner and the outer wall 12, 14 in this way, wherein the sealing element 28 for providing sealing is held between the walls 12, 14 in a manner sealed with a press fit and the deflection fins 30 can in each case bear against at least one of the walls 12, 14 without contact, with physical contact or else in a sealing manner. Accordingly, a thickness of the deflection fins 30, which is measured in the radial direction, can be less than or equal to a thickness of the sealing element 28, which thickness is measured in the radial direction.

The deflection fins 30 and the sealing element 28 are preferably of integral design. However, the deflection fins 30 and the sealing element 28 can also be fastened to one another as separate components. The deflection fins 30 can also be inserted between the inner wall 12 and the outer wall 14 as pins or peg elements and can be fixed to at least one of the inner or the outer wall 12, 14 in the axial direction by the sealing element 28 and/or a stop element.

Overall, the sealing apparatuses 24, 26 can be produced substantially from plastic and/or from a metal and joined into the housing 10, for example by pressing, welding and/or adhesive bonding. In particular, the sealing apparatuses 24, 26 can be composed of an elastic material, for example an elastomer, e.g. silicone.

In order to seal off the hollow space 16 and to prevent cooling fluid from leaking from the hollow space 16, a plurality of circumferential and radially protruding sealing lips 32a, which each bear against the inner wall 12 in a sealing manner, are formed on an inner circumference on each sealing element 28. A plurality of circumferential and radially protruding sealing lips 32b, which each bear against the outer wall 14 in a sealing manner, are also formed on an outer circumference of the sealing element 28. By virtue of the sealing lips 32a, 32b, the hollow space 16 and, respectively, the housing 10 can be sealed both in the axial and in the radial direction. The sealing lips 32a, 32b can be produced, for example, from plastic, rubber and/or silicone and can be adhesively bonded and/or welded to the sealing element 28. The sealing lips 32a, 32b can also be integrally formed with the sealing element 28. Furthermore, recesses which are configured such that they cooperate with the sealing lips 32a, 32b and in which the sealing lips 32a, 32b can be at least partially held, can be provided in the inner and/or the outer wall 12, 14.

As an alternative or in addition to the sealing lips 32a, 32b, at least one insert seal, for example in the form of an O-ring, and/or at least one seal which is injection-molded and/or fitted onto the sealing element 28 can be provided on the sealing element 28 on an inner circumference and/or an outer circumference of the sealing element 28. Furthermore, the sealing element 28 can be at least partially adhesively bonded and/or welded to the housing 10 or to the inner wall 12 and/or the outer wall 14 for further sealing purposes.

Furthermore, the housing 10 has a cover 34 on each end face, said cover being fastened, for example screwed, to the housing 10 by means of the fastening apparatus 20. The covers 34 can be designed, for example, as end plates and can each adjoin and/or bear in a sealing manner, by way of one side, against a side of the sealing element 28 which is situated opposite the deflection fins 30. As a result, the sealing apparatuses 24, 26 can firstly be additionally fixed and secondly a leaktight arrangement of the cover 34 on the housing can be provided, in particular in the axial direction.

Furthermore, the housing 10 has an inlet 36 and an outlet 38 for cooling fluid, which inlet and outlet are each made in the outer wall, for example in the form of bores and/or recesses. As an alternative, the inlet 36 and the outlet 38 can also be integrated in the end face of one of the sealing elements 24, 26. By way of example, a pump apparatus with a cooling line can be arranged at the inlet 36 and/or the outlet, so that cooling fluid can be conveyed into and/or out of the hollow space 16 in the housing. Valve apparatuses for regulating a flow rate of cooling fluid can also be provided at the inlet 36 and/or the outlet 38.

In this case, the cooling fluid can assume a profile through the hollow space 16 in the housing as described below. A deflection fin 30 of the sealing apparatus 24 bears against that guide fin 18 of the housing 10 which is arranged between the inlet 36 and the outlet 38 in the region of the end face 22, and a deflection fin 30 of the sealing apparatus 26 bears against said guide fin in the region of the opposite end face 23, so that a barrier for the cooling fluid is formed between the inlet 36 and the outlet 38 by the two deflection fins 30 and the guide fin 18, said barrier extending parallel in relation to the axial direction over the entire longitudinal extent of the hollow space 16. However, only precisely one deflection fin 30 of one of the sealing apparatuses 24, 26 bears against the remaining guide fins 18 in an alternating manner in each case. As a result, a meandering cooling duct 40 is formed in the hollow space 16 in the housing 10, the cooling fluid flowing alternately parallel and antiparallel in relation to the axial direction in said cooling duct, wherein the cooling fluid is also deflected by the sealing element 28 of the sealing apparatuses 24, 26 at each end face 22, 23. This can advantageously contribute to preventing dead water areas in the hollow space 16.

Figure 3:
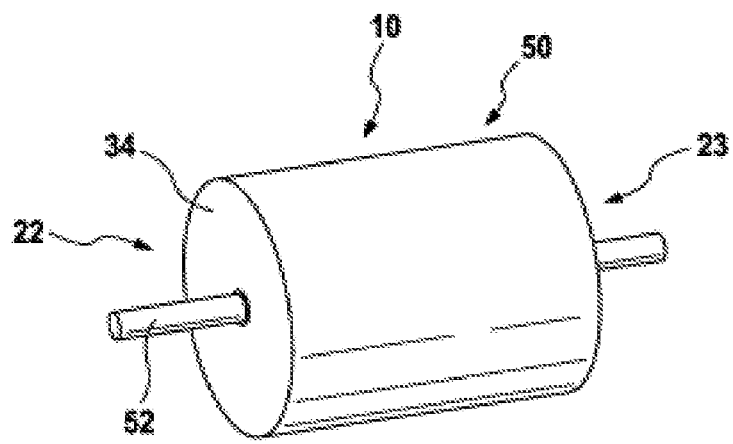
FIG. 3 shows an electrical machine according to one embodiment of the invention.

FIG. 3 shows an electrical machine 50 according to one embodiment of the invention. The electrical machine 50 has a housing 10 with a cover 34 at each end face 22, 23 and has a shaft 52 which is rotatably mounted in the covers 34. The electrical machine 50 can be, for example, an electric motor or a generator.

Finally, it should be noted that terms such as "having", "comprising" etc. do not rule out other elements, and terms such as "a" or "one" do not rule out a multiplicity. Furthermore, it should be noted that features which have been described with reference to one of the above exemplary embodiments can also be used in combination with other

What is claimed is:

1. A housing (10) for an electrical machine (50), the housing (10) having:
 an inner wall (12) and an outer wall (14) which are arranged concentrically in relation to one another and at a distance from one another,
 wherein a hollow space (16), which is delimited in a radial direction by the inner and outer walls (12, 14), is configured for cooling the electrical machine (50) using fluid and is formed between the inner wall (12) and the outer wall (14),
 wherein guide fins (18), which extend along the axial direction, are arranged between the inner wall (12) and the outer wall (14) at a distance from one another in the circumferential direction,
 wherein a sealing apparatus (24, 26) which is arranged on an end face (22, 23) on each, opposite end of the housing (10),
 wherein each sealing apparatus (24, 26) has a respective annular sealing element (28) which is held at the respective end face in a sealing manner between the inner wall (12) and the outer wall (14), wherein each sealing apparatus (24, 26) has a plurality of deflection fins (30), each protruding from the respective sealing element (28) in an axial direction of the housing (10) and is arranged at least partially between the inner wall (12) and the outer wall (14),
 wherein the plurality of deflection fins (30) are configured to guide a cooling fluid in the hollow space (16),
 wherein one of the plurality of deflection fins (30) of a first of each respective annular sealing element (28) and another of the plurality of deflection fins (30) of a second of each respective annular sealing element (28) are aligned with and contact opposite ends of one of the guide fins (18), and
 wherein the remaining deflection fins (30) of each sealing apparatus (24, 26) are arranged in an alternating manner on opposite ends of the housing (10) in alignment with respective remaining guide fins (18), so that the plurality of deflection fins (30) and the guide fins (18) form a meandering cooling duct (40) in the hollow space (16).

2. The housing (10) as claimed in claim 1, wherein each sealing element (28) and the respective plurality of deflection fins (30) are integrally formed.

3. The housing (10) as claimed in claim 1, wherein the plurality of deflection fins (30) protrude in the manner of fingers from the sealing element (28) in the axial direction.

4. The housing (10) as claimed in claim 1, wherein at least one sealing lip (32*a*, 32*b*) which runs on an inner circumference and/or an outer circumference of each sealing element (28) and protrudes from each sealing element in a radial manner and seals against in each case one of the walls (12, 14) is arranged on each annular sealing element (28).

5. The housing (10) as claimed in claim 1, wherein the walls (12, 14) are extruded.

6. An electrical machine (50) comprising a housing (10) as claimed in claim 1.

7. The electrical machine as claimed in claim 6, wherein each sealing element (28) and the respective plurality of deflection fins (30) are integrally formed.

8. The electrical machine as claimed in claim 6, wherein the plurality of deflection fins (30) protrude in the manner of fingers from the sealing element (28) in the axial direction.

9. The electrical machine as claimed in claim 6, wherein at least one sealing lip (32*a*, 32*b*) which runs on an inner circumference and/or an outer circumference of each sealing element (28) and protrudes from each sealing element in a radial manner and seals against in each case one of the walls (12, 14) is arranged on each annular sealing element (28).

10. The electrical machine as claimed in claim 6, wherein the walls (12, 14) are extruded.

* * * * *